No. 653,010. Patented July 3, 1900.
C. H. KOYL.
APPARATUS FOR PURIFYING WATER.
(Application filed Dec. 20, 1899.)
(No Model.) 2 Sheets—Sheet 1.
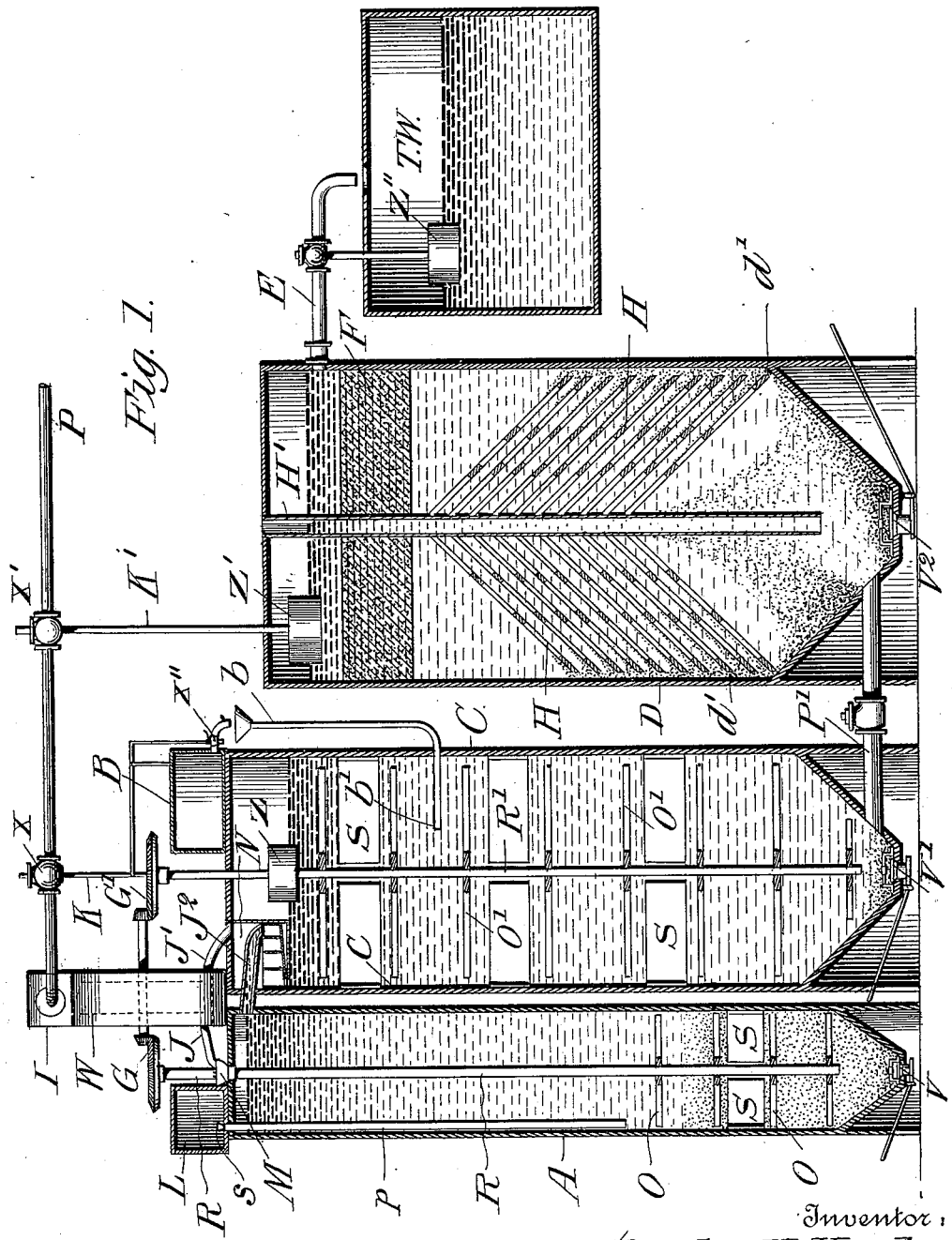
Witnesses
L. C. Hills.
Edwin King Lundy
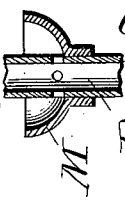
Inventor:
Charles H. Koyl
By Marcellus Bailey
his Attorney No. 653,010. Patented July 3, 1900.
C. H. KOYL.
APPARATUS FOR PURIFYING WATER.
(Application filed Dec. 20, 1899.)
(No Model.) 2 Sheets—Sheet 2.
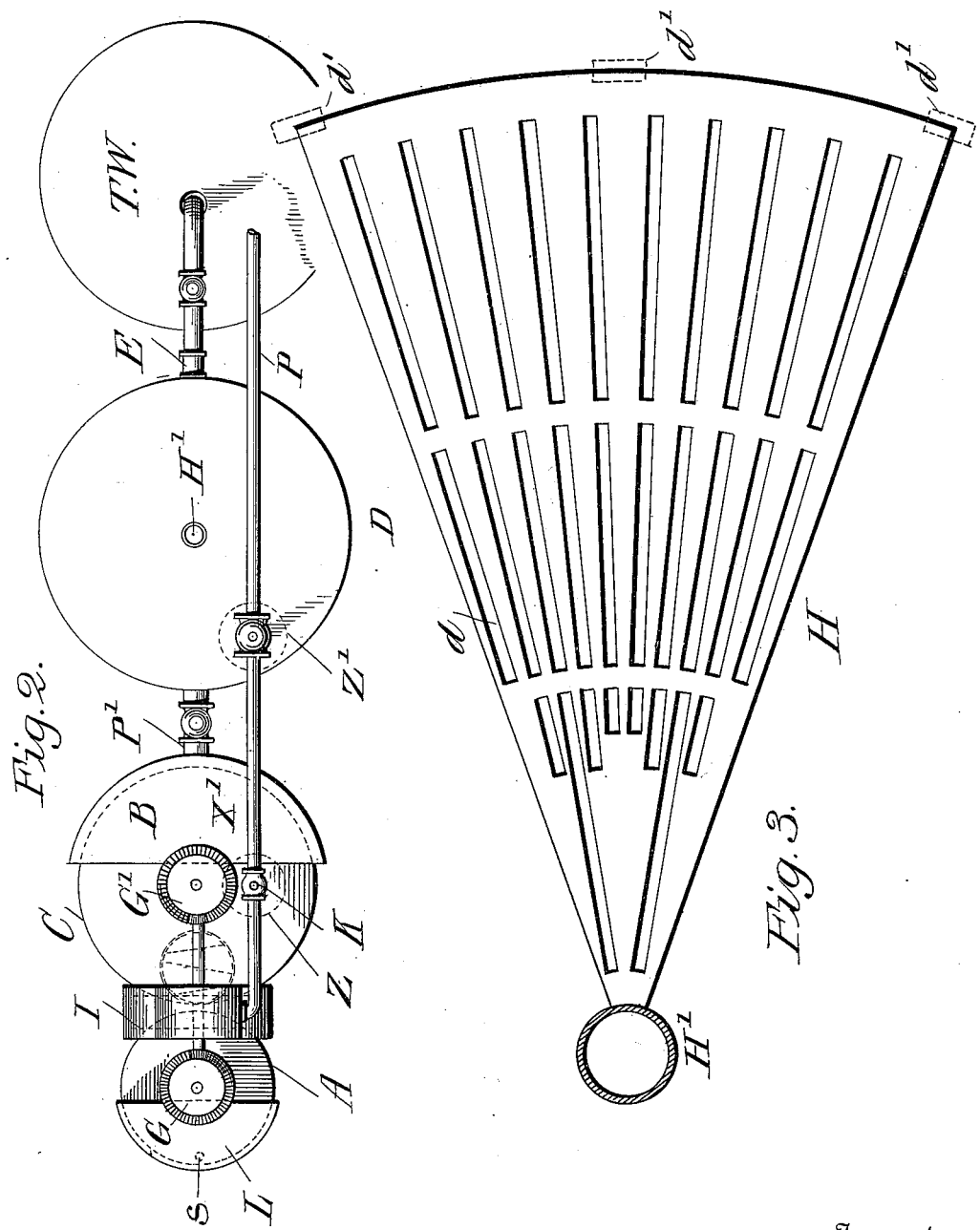
Witnesses:
L. C. Hills.
Edwin King Lundy.
Inventor:
Charles H. Koyl,
By Marcellus Bailey
his Attorney.

UNITED STATES PATENT OFFICE.

CHARLES HERSCHEL KOYL, OF NEW YORK, N. Y.

APPARATUS FOR PURIFYING WATER.

SPECIFICATION forming part of Letters Patent No. 653,010, dated July 3, 1900.

Application filed December 20, 1899. Serial No. 740,958. (No model.)

*To all whom it may concern:*

Be it known that I, CHARLES HERSCHEL KOYL, of New York, in the county and State of New York, have invented a certain new and useful Improvement in Apparatus for Softening and Purifying Water; and I hereby declare that the following is a full and exact description thereof, reference being made to the accompanying drawings.

My invention is intended, primarily, for the elimination from hard water of its scale-forming material by chemical precipitation and subsequent settling or filtration, or both; but it is as well adapted to the purification of any kind of water in which chemical reagents and subsequent settling or filtration, or both, are necessary.

The essential parts of any modern water-softening apparatus are, first, tanks for the solution and subsequent supply of chemical reagents; second, a tank, generally known as the "reaction tank," in which the chemicals are mixed with and act upon the raw water; third, a settling and filtering tank or tanks within which the water is freed from its suspended matter, and, fourth, floats and valves so connected as to keep (a) the supply of raw water equal to the demand for treated water and (b) the supply of reagents proportional to the supply of raw water.

It is my object to provide an apparatus in which these conditions are realized in a simple and efficient way.

To this end my invention consists in certain novel combinations and arrangements of the parts which make up the apparatus, which will first be described in connection with the accompanying drawings, forming a part of this specification, and will then be more particularly pointed out in the claim.

In said drawings, Figure 1 is a vertical central section of the complete apparatus. Fig. 2 is a plan of the same; and Fig. 3 is a view, enlarged, of one of the cone-segments of the settling-tank, which will be hereinafter more particularly referred to. Fig. 1$^a$ is a sectional detail.

The principal parts of the apparatus are the reaction-tank C and the settling and filtering tank D, with their fittings and appliances. In connection with them I also use a tank A for the solution and supply of one of the reagents in cases where it is convenient or desirable.

Referring now to Figs. 1 and 2, A is a tank for the solution and supply of lime (CaO) or other slightly-soluble chemical.

B is a tank for the solution and supply of sal-soda ($Na_2CO_3$) or other easily-soluble chemical.

C is a reaction-tank, to which are fed the raw water and the lime and soda or other reagents in definite amounts and within which these reagents are mixed with and act upon the water, producing precipitates of the material which it is desired to take out of the water.

D is a settling and filtering tank, in which the water rises slowly to the top, leaving its precipitates, and from the top of which tank the water issues through the pipe E soft and clean and ready for use.

Each of the three tanks A, C, and D is provided at the bottom with a sediment-chamber formed by giving the lower end of the tank a conical or tapering shape, the bottom of each chamber being closed by a dumping-valve V, V', or V'', which by a suitable lever can be opened whenever desired to dump or discharge the accumulated sediment in the tank. The raw water through the pipe P discharges into a box I, fitted near its bottom with two outlet-pipes or exits J J',(which of course will be provided with sluice-gates or cocks to regulate the discharge.) The one pipe J discharges a part of the raw water into a bowl M, surrounding the central pipe R in tank A, which pipe is mounted so as to revolve and has attached to it radial stirrers O. Within the bowl M there are perforations in the central pipe R as seen more plainly in Fig. 1$^a$, through which the water from pipe J will pass into the pipe R, and passing down the latter will be discharged from its lower end into the tank A. The remainder of the raw water discharges from the pipe J' into the pan N, into which also discharges through a chute J'' the chemical from tank A. From the pan (which is provided with a series of baffle-plates to insure the more thorough intermingling of the chemical with the raw water) the water passes into the reaction-tank C. The chemical from box B discharges through an exit-nozzle controlled by a valve or cock X'' into pipe b, which, for a purpose hereinafter indicated leads into the reaction-tank C at a point some distance below where the water mixed with the chemical from tank A enters. The flowing water in pipe P is controlled by the valves X X', which are controlled by floats Z Z' in the tanks C D, respectively, through the operation of intermediate connections. The same means are employed to control the cock X'' of the box B, said cock being connected to the float Z, as shown. Mechanism of this kind is well known and requires no detail description or illustration. The said pipe E is provided with a valve which is similarly controlled by a float Z'', located in the tank T W, which contains the treated or purified water. The reaction-tank C is provided with a central shaft R', which, like the hollow shaft R in tank A, is provided with radial stirrers O'. Within the inlet-box I is mounted a water-wheel W, which is driven by the entering water, and the shafts R R' are driven from the water-wheel by gearing typically represented at G G'. Each tank A and C contains baffle-plates S to prevent undue movement of the liquid.

The water from the reaction-tank C enters the settling-tank D through pipe P' at a point very near the bottom of the latter tank. Within the settling-tank is placed a series of superposed radially slitted or perforated hollow settling-cones H, placed small end uppermost, surrounding at the center a pipe H', open at both ends and resting at their bases on brackets provided for that purpose upon the inner wall of the settling-tank, these cones nesting together, but being placed at a certain interval apart from one another. Above the central cone and at or near the top of the tank D is a filter-bed F.

Such is a general description of the apparatus.

Taking as an illustration the apparatus fitted up for the softening of water which contains carbonates, sulfates, chlorids, and nitrates of calcium and magnesium, and for which the chemical reagents most suitable, because of their cheapness and efficiency, are fresh lime (CaO) and sal-soda, ($Na_2CO_3$,) the operation is as follows: The raw water arrives through the pipe P and entering the box I falls directly upon the water-wheel W and then passes out to the tanks A C through pipes J J'. When the machine is filled with water and ready for use, a definite amount of fresh lime (CaO) is placed in the box L, is there slaked, and then by the raising of a stopper s is allowed to flow down as milk of lime toward the bottom of the tank A through the pipe p, provided for the purpose. This milk of lime is kept thoroughly mixed with the water in the tank A by means of the rotation of the shaft R with its stirring-bars O, which is kept in motion through the gear G by means of the water-wheel W, driven by the inflowing water. This milk of lime is therefore steadily and slowly being converted into lime-water, $Ca(OH)_2$, which fills the tank A. At the same time a definite amount of sal-soda ($Na_2CO_3$) is placed in the box B, where it is dissolved in an amount of water sufficient to fill the box B and is then ready to flow as required down the pipe b to mix with the water in the reaction-tank C. The flow of water in the pipe P is controlled by the valves X and X', which are opened or closed by the falling or rising, respectively, of the floats Z and Z', respectively, so that when water is allowed to flow from the exit E the heights of water in tanks D and C are lowered, the floats are lowered accordingly, the valves are therefore opened to a proportionate amount, and water begins to flow to the machine through the pipe P. The connecting-rod K of the float Z is also connected with the valve X'' of the soda-box B, so that when the float falls and water is allowed to flow into the machine the valve X'' in the soda-box is opened proportionately and the solution of soda is allowed to flow down the pipe b. A small predetermined portion of the water from the wheel W flows through the pipe J to the bowl M, which surrounds the pipe R, perforated within the bowl, so as to permit the passage of water downward through the pipe R to the bottom of the tank A, where it mixes with lime to become saturated lime-water and rises to flow out through the chute J'' to the pan N, where it mixes with the remainder of the raw water, which flows in a stream through the other exit J' from the water-wheel box I. The combined stream then flows from the pan N into the tank C and passes downward, being joined at the point b' by the inflowing solution of soda, being all the time agitated and mixed by the rotation of the stirrer-shaft R', and finally passing out at the bottom of the tank C through the pipe P' to the bottom of the settling-tank D, whence it rises slowly through the perforated cones H, through the filter F, and out through the soft-water exit E. It is important in treating such water that the lime-water $Ca(OH)_2$ shall be allowed to act upon all the raw water for a few moments before the raw water is acted upon by the sal-soda or other chemical.

Water containing bicarbonate of calcium or magnesium nearly always holds in solution free carbonic-acid gas, ($CO_2$.) If this $CO_2$ be allowed to reach the sal-soda, the latter will be impeded in its proper work of decomposing the sulfates, nitrates, and chlorids, which may be present in the water by reason of its greater affinity for the $CO_2$, with which it will combine to form sodium bicarbonate; but by acting on the $CO_2$ with the lime before it can reach the sal-soda the $CO_2$ is most easily taken up by the lime to form the precipitate $CaCO_3$,(calcium carbonate.) It therefore is arranged in my invention that the contents of the box B shall enter the reaction-tank not at the top, but at a point $b'$ about one-third the distance to the bottom of the tank. This will give ample opportunity for the lime to take up the $CO_2$. In this way and in an apparatus for the continuous purification of water I am enabled to provide a single reaction-tank in which the water is acted upon by the several chemical reagents in sequence only.

I have found that the fine precipitates formed by the chemical action referred to are much aided in their settling by passing through a body of water containing a large amount of sediment. For this reason the connecting-pipe $P'$ from the reaction-tank C is entered as low as possible in the settling-tank D in order that the incoming water, with its fine precipitates, may be forced to pass upward through the mass of precipitate already in the bottom of the tank D.

To facilitate the settling in the tank D of the precipitates which are carried upward by the water to some distance from the bottom of the said tank, it has been customary to place within the settling-tank a series of plates inclined so that the sediment will readily slide off and the spaces between which plates constitute in effect shallow settling-basins. Sometimes these plates are arranged in the shape of spirals around a central core, so that the water following the course of the spirals may deposit its precipitates on the way up; but for the sake of convenient placing and removal these spirals are generally put in as loose sheets, and the connections of the same with the core and with the circumference of the tank and with each other are so loose and open that the water finds it easier to rise through these openings than through the more tortuous channels formed by the spirals, with the result that the water does not rise slowly as a mass and settle its suspended matter, but rushes in small streams through these openings and arrives at the filter loaded with suspended matter. Another device in use is that of perforated funnels, (placed small end downward,) through the perforations of which the water rises with easy speed and during its slower passage from funnel to funnel settles its precipitates upon the funnel-plates, these precipitates sliding down to the central opening, which is common to all the funnels, and passing thus to the bottom of the settling-tank; but the difficulty in the use of this device is that since the circumference of the funnel gets continuously smaller as the center is approached the precipitates in the act of sliding down the surface of the funnel pass over the perforations toward the center, and thus become again suspended matter. To overcome these difficulties, I use for settling-plates a series of hollow cones placed small end uppermost, with the result that the sediment slides outward and downward toward the wall of the settling-tank and thence to the bottom of the tank, there being a space between the bottom of each cone and the wall of the tank, and since the circumference of the cone gets greater toward the bottom the result is that the unperforated sliding-surface becomes continuously greater toward the bottom of each cone, and there is therefore no tendency of the precipitates to slide over the perforations which, it should be said, are arranged in radial lines from the center of the cone to the circumference.

Since it is desirable that the water shall move upward in the settling-tank as slowly and quietly as possible and since it is desirable that the precipitates settling upon the inclined plates shall not in their downward motion cross any perforations in the plate through which they might fall into the rising water, I make the perforations in the cones in the form of radial slits, leaving only so much of the metal unperforated as is necessary to the stability of the cones and to provide an adequate settling-surface. For ease in handling, in setting up, and in removal for any purpose the cones are each composed of a series of segments which are bent to the proper curve before they are placed in position, and are then set in place, resting at the bottom upon brackets $d'$, secured to the inner wall of the tank and resting at the upper truncated points against the central rod or pipe $H'$. Fig. 3 shows in detail one such cone-segment, $d$ being the radially-arranged slits therein. The water after rising through the slits or perforations of the cones passes upward through the coarse filter F, which stops any floating particles and leaves the water free and clean for use. The rod or pipe $H'$ is hollow and is open at both ends, so that water from the lower part of the settling-tank will rise in it. By comparing the level of the water in this tube with that of the water in the tank above the filter F, I can determine whether the filter F is doing its duty or whether it is so clogged as to prevent the free and proper flow of water therethrough.

In other applications—viz., Serial Nos. 4,620 and 4,621, filed February 9, 1900, constituting divisions of this application—I have claimed the combination and arrangement of the parts constituting the settling-tank and the combination of the settling-tank with a communicating duct which leads from the reaction-tank into the settling-tank at a point in or very near the bottom of the latter.

What I here claim, and desire to secure by Letters Patent, is—

In apparatus for the continuous purification of water, a reaction-tank, means for supplying water thereto, reservoirs for containing the several reagents to be mixed with and act upon the water, pipes or inlets leading from said reservoirs respectively and opening into the reaction-tank at different levels, substantially as described, so that the water entering and passing through said tank shall meet and be acted upon by the several reagents successively and in sequence only, a stirrer contained in said tank and means for actuating the same, substantially as and for the purposes hereinbefore set forth.

In testimony whereof I have hereunto set my hand this 11th day of December, 1899.

CHARLES HERSCHEL KOYL.

Witnesses:
 HENRY BEYER,
 LOIS M. BOOTH.